July 10, 1956 C. FELTON 2,754,170

MULTIPLE RECORD PRINTING RECORDERS

Filed Jan. 19, 1952 4 Sheets-Sheet 1

INVENTOR:
Charles Felton,
BY
E. S. Borth.
ATTORNEY.

INVENTOR:
Charles Felton,
BY
E. S. Booth.
ATTORNEY.

July 10, 1956 C. FELTON 2,754,170

MULTIPLE RECORD PRINTING RECORDERS

Filed Jan. 19, 1952

4 Sheets-Sheet 3

INVENTOR:
Charles Felton,
BY
E. S. Borth,
ATTORNEY.

INVENTOR:
Charles Felton,
BY
E. S. Booth,
ATTORNEY.

United States Patent Office 2,754,170

Patented July 10, 1956

2,754,170

MULTIPLE RECORD PRINTING RECORDERS

Charles Felton, Chicago, Ill., assignor, by mesne assignments, to Barber-Colman Company, Rockford, Ill., a corporation of Illinois Application January 19, 1952, Serial No. 267,231

2 Claims. (Cl. 346—139)

This invention relates to multiple record printing recorders, and more particularly to a recorder in which a plurality of records indicating a plurality of different conditions are indicated by different printed symbols.

Multiple recorders for recording a plurality of different conditions on a single chart by means of different symbols are known. All such devices have included a multiple printer carrying a plurality of different symbols, a drive system to move the printer to different positions corresponding to the values of different conditions, and a selector switch to connect the drive system to different sensing elements corresponding to different conditions to be recorded. The multiple printer has been adjusted simultaneously with the change of connection from one sensing element to another so that each condition is indicated by its own easily identifiable symbol. The present invention relates to improvements in multiple recorders of this type, and specifically to improvements in the printing mechanism and in the selecting mechanism.

It is one of the objects of the present invention to provide a multiple recorder in which the printer and selector switch are operated in accurately timed relation to each other to insure that the symbol presented by the printer corresponds to the condition then being measured, and that the drive system will properly position the printer to correspond to the existing value of the condition before the printer is operated.

Another object is to provide a multiple recorder in which the printer includes a pivoted arm swingable from a normal to a printing position with a rotatable printing head on the arm which is turned through a ratchet mechanism each time the arm is swung in a printing operation.

Still another object is to provide a multiple recorder in which the printing arm is pivoted on a carriage which is slidable along the recorder frame and is operated by an elongated cam bar rotatably mounted on the frame and engaging the arm and the carriage.

According to one feature of the invention, the cam bar is mounted on the frame for limited lateral floating so that it acts directly between the carriage and the arm thereby to limit its bending load.

A further object is to provide a multiple printer in which the selector switch is a rotating type switch driven by a motor which also actuates the printer through a cam mechanism.

A still further object is to provide a multiple recorder in which the selector switch makes contact with a sensing element next in series before breaking contact with the sensing element prior in the series.

According to one feature the selector switch includes a series of contact pins arranged annularly and engaged by a contact strip on an arm carried by the switch rotor. Preferably each pin has two spaced contact surfaces and there are two contact strips which are resiliently mounted on the rotor arm to insure proper contact regardless of irregularities in the construction.

A still further object is to provide a multiple recorder which is relatively simple and inexpensive in construction and which is extremely sturdy and reliable in operation.

The above and other objects and features of the invention will be more readily apparent from the following description when read in connection with the accompanying drawing in which Figure 1 is a partial plan view with parts broken away of a multiple recorder embodying the invention;

Figure 1:
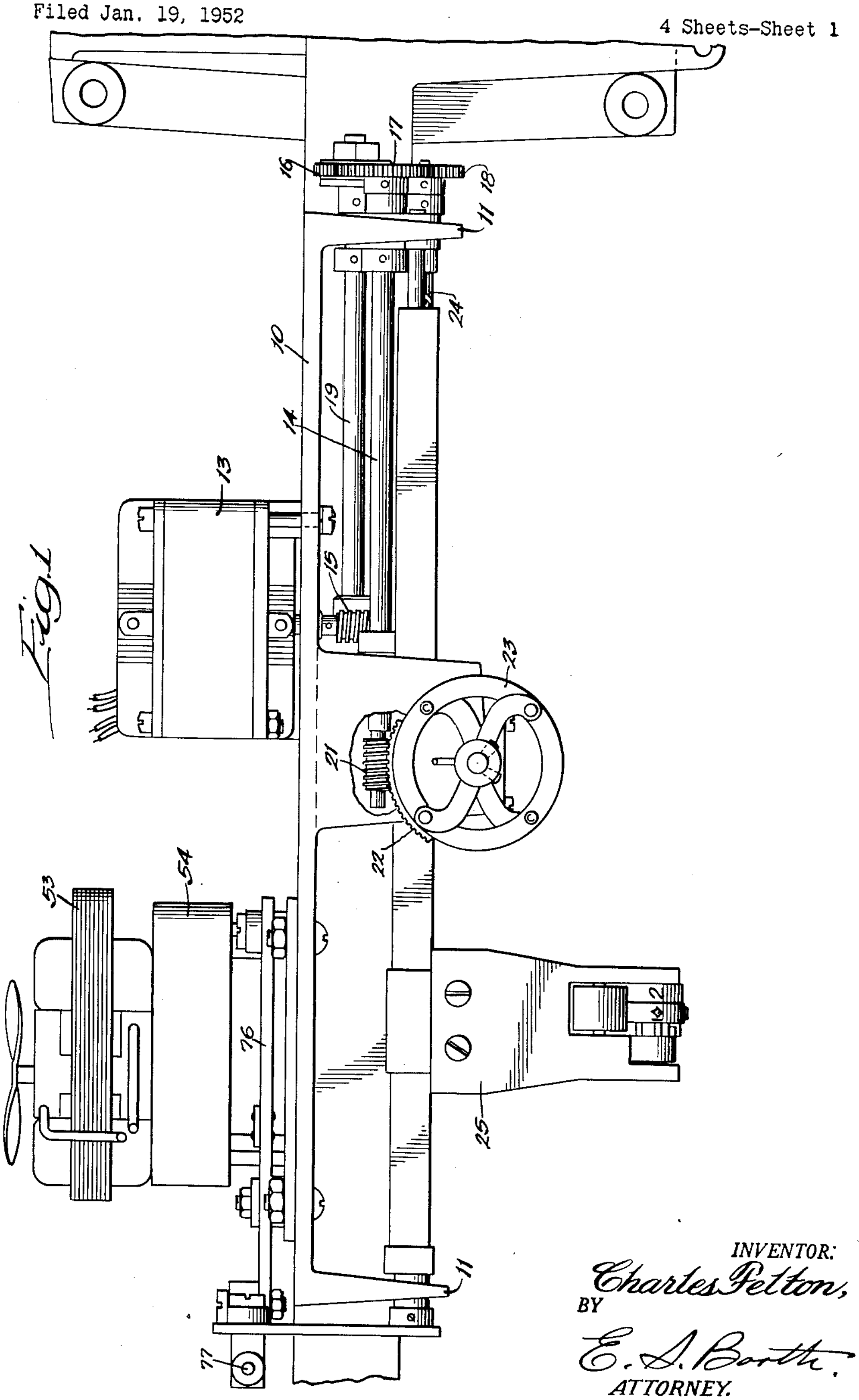
Figure 2:
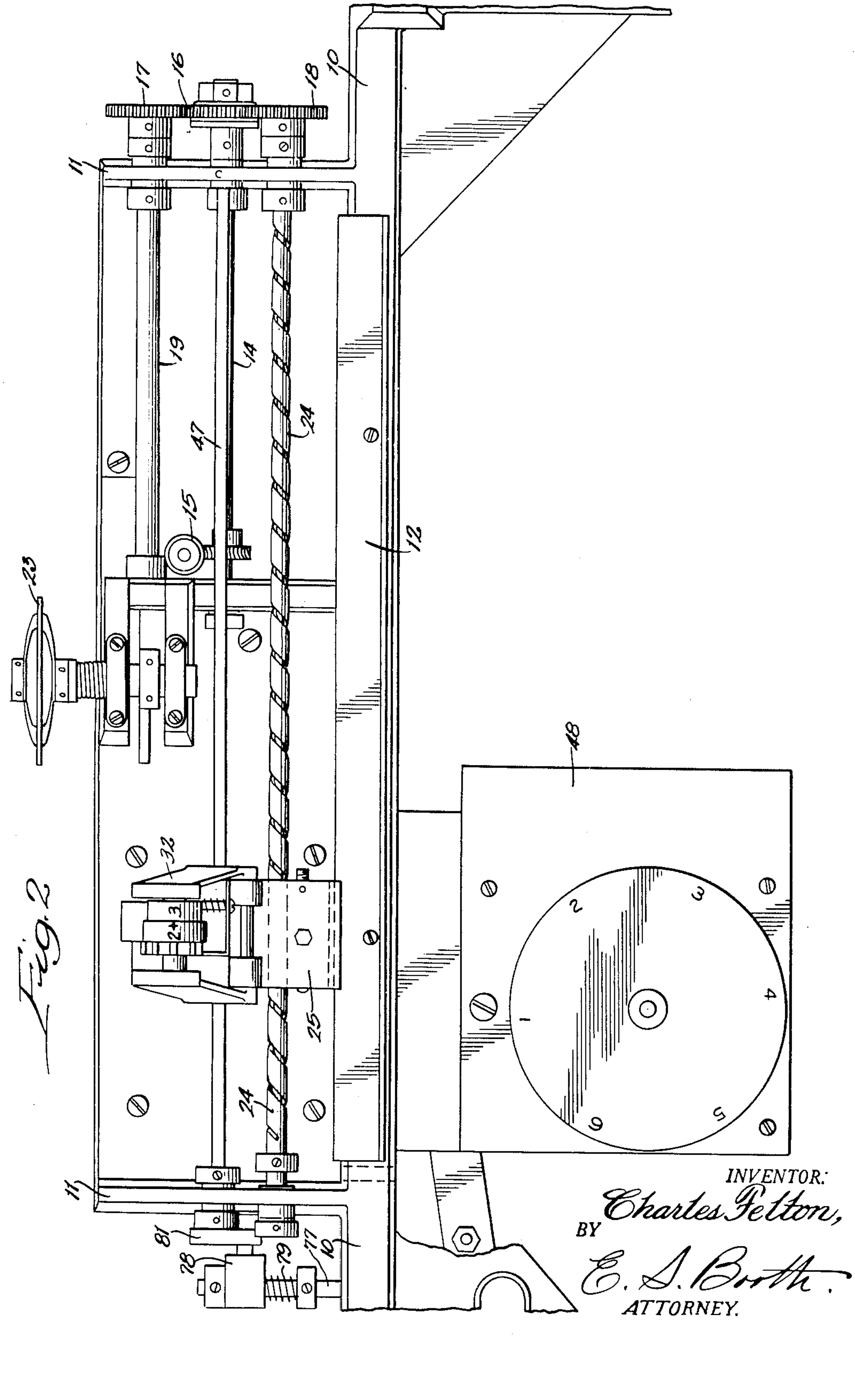
Figure 2 is a partial front elevation with parts broken away.
Figure 3:
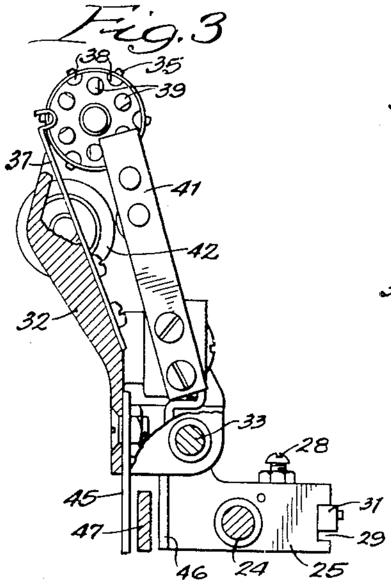
Figure 3 is a section through the printing head.

As best seen in Figures 1 and 2, the recording mechanism comprises an elongated frame indicated generally at 10, having side brackets 11 and carrying at its lower part a guide bar 12 in the form of a flat relatively narrow strip.

The frame carries a main driving motor 13 which is adapted to be controlled in response to any one of a plurality of sensing devices, such for example, as thermocouples, to indicate different conditions. The motor 13 may be connected to the sensing devices through any conventional type of recording mechanism and will be energized to move to a position corresponding to the existing value of the condition sensed by the device to which the motor is connected. Since this mechanism is well known and forms no part of the present invention it is not illustrated in detail.

The motor drives a driving shaft 14 which is journaled in the frame through a worm and worm gear set indicated at 15. The shaft 14 carries a driving pinion 16 which meshes with pinions 17 and 18 to turn them as the motor operates. The pinion 17 drives a shaft 19 which carries a worm 21 meshing with a worm segment 22. The worm segment 22 is connected through a flexible coupling 23 to any desired type of control mechanism to effect a control operation in the condition being sensed. In the case of temperature, for example, the coupling 23 may be connected through a control device which will either increase or decrease the head input to maintain the temperature at a desired value.

The pinion 18 is connected to a spirally threaded shaft 24 which extends lengthwise of the frame and is rotatable thereon. The shaft 24 moves a carriage 25 along the frame to a position proportional to the value of the condition then being sensed.

As best seen in Figures 3 to 6, the shaft 24 extends through cylindrical guide bores in the carriage 25 and is engaged by a follower pin 26 carried by a flexible strip 27 on the carriage. The strip 27 can be adjusted by a screw 28 to insure proper contact of the follower pin 26 with the feed screw 24 so that no binding can occur and the carriage will be fed properly along the frame as the screw 24 turns. The carriage is held against tilting movement by the screw 24 and by means of a groove 29 in its bottom surface which receives the guide bar 12 on the frame. Preferably a friction block 31 is secured in the groove 29 to obtain an accurate free sliding fit against the guide bar 12.

Figure 4:
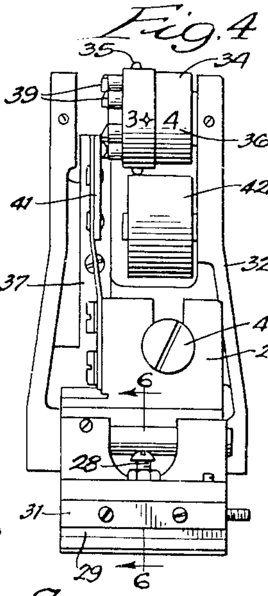
Figure 4 is a bottom plan view of the printing head.

A printer arm 32 is pivoted on the carriage 25 on a transverse pivot pin 33. As best seen in Figure 4, the arm 32 is in the form of a yoke and at its free end rotatably supports a printing head 34 which, in this instance, is cylindrical in shape. The printing head carries a series of raised angularly shaped printing characters 35 at its periphery which are adapted to be brought successively into a printing position as the head is turned about its axis and which are movable with the head 54 and the arm 32 about the pivot 33 in a clockwise direction from an idle position shown in Fig. 3 to a printing position spaced angularly a few degrees from the idle position. In the printing position of the head, the lowermost character 35 contacts a chart (not shown) mounted on the frame. Indicating characters as shown at 36 may also be provided on the printing head which are visible to the operator to indicate which character will be printed in the next operation of the mechanism.

The printing head is resiliently held at any one of its several positions of adjustment about its axis by a spring detent mechanism including an elongated leaf spring 37 which is secured at one end to the arm 32 and which, at its outer or free end, has a rounded portion to fit into detent notches 38 in the periphery of the head. The head is indexed or turned about its axis automatically as an incident to movement of the head away from its idle position into its printing position and back to the idle position. This is accomplished by a ratchet mechanism having parts mounted on the arm 32 and the carriage 25 and including interengageable elements 39 and 41 which are conditioned for operation in the movement of the head toward the printing position and which are operable in the movement of the head toward the idle position to index the head about its axis in a counterclockwise direction as viewed in Fig. 3 and through an angle corresponding to the spacing of the characters 35 on the head. In this instance, the interengageable ratchet elements are a pawl 41 mounted on the carriage and ratchet teeth 39 projecting axially from one end of the head 34 and angularly spaced around the latter. The pawl 41 is in the form of an elongated leaf spring secured at one end to the carriage and projecting outwardly therefrom to a position short of the center of the head but adjacent the projecting ends of the teeth 39, the spring being tensioned toward the head so that its free end engages the teeth. Instead of contacting the teeth directly, the pawl spring may carry a small block riveted to its upper end and engageable with the teeth ends as shown in Fig. 4.

To condition the ratchet mechanism for operation, each tooth 39 is formed on its projecting end with an axially facing surface (see Fig. 4) inclined forwardly in the direction of rotation of the head and engageable with the pawl 41 to urge the latter axially away from the head to permit the tooth to move past the pawl as the head moves into the printing position. As soon as the tooth moves past the pawl, the latter drops behind the tooth to engage an abutment formed by the trailing side of the tooth and to turn the head as the latter moves back to its idle position so that, in the next printing operation, the next character in the series will be effective. The spring 37 holds the head against turning as each ratchet tooth slides past the pawl, but permits rotation of the head when the pawl engages the trailing side of each tooth. The printing characters may be inked by means of an ink roll 42 carried by the arm in a position to engage the printing characters on the head as the head is turned.

Figure 5:
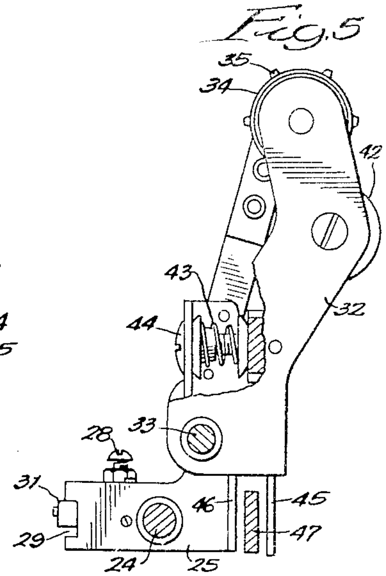
Figure 5 is a side elevation with parts broken away and in section.
Figure 7:
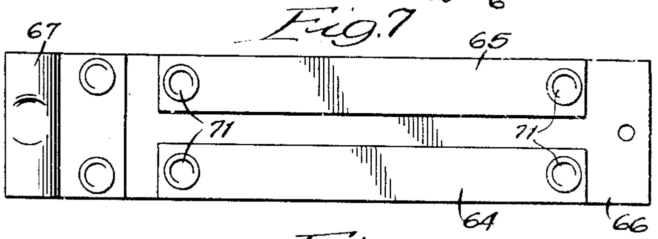
Figure 7 is an elevation of the selector switch rotor assembly.
Figure 6:
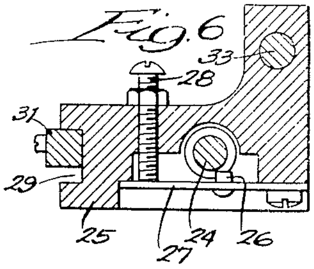
Figure 6 is a section through the carriage on the line 6—6 of Figure 4.

The head is normally held upward in its inoperative position by means of a compression spring 43 as shown in Figure 5, which engages the arm and the head. The spring may be adjusted by a screw 44 so that it will hold the arm properly in position. To swing the arm down for a printing operation an extension 45 is provided thereon which provides a flat surface parallel to and spaced from a flat surface on a plate member 46 on the carriage. An elongated flat cam bar 47 lies between the extension 45 and the plate member 46 and has a width greater than the spacing between the flat surfaces so that when the cam bar is turned about its longitudinal axis, the surfaces will be separated and the printing arm will be swung relative to the carriage to effect a printing operation.

The cam bar 47 is preferably loosely journaled in the frame end members 11 so that it can float laterally to a limited extent. In this way, the cam bar acts directly between the elements 45 and 46 and the bending load thereon is minimized. During operation the cam bar is adapted to be turned through an angle slightly less than 90° and then rocked back to its normal position as shown in the drawing, to allow the head to turn to its normal position under the influence of the spring 43.

Figure 9:
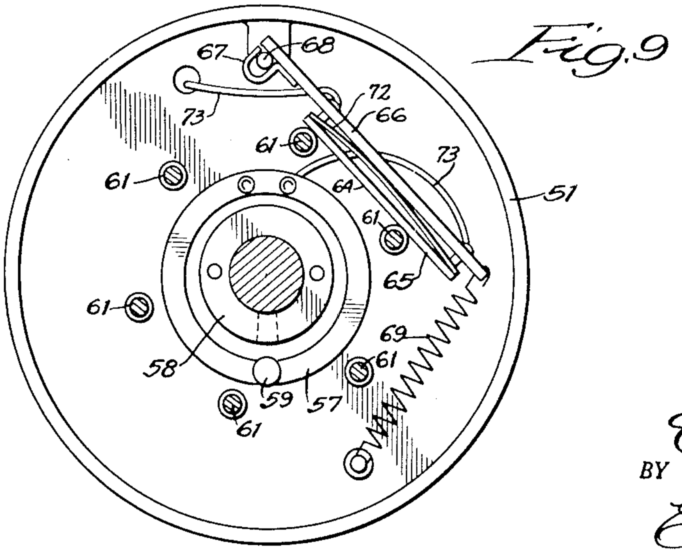
Figure 9 is a view of the selector switch rotor mechanism.
Figures 10, 11:
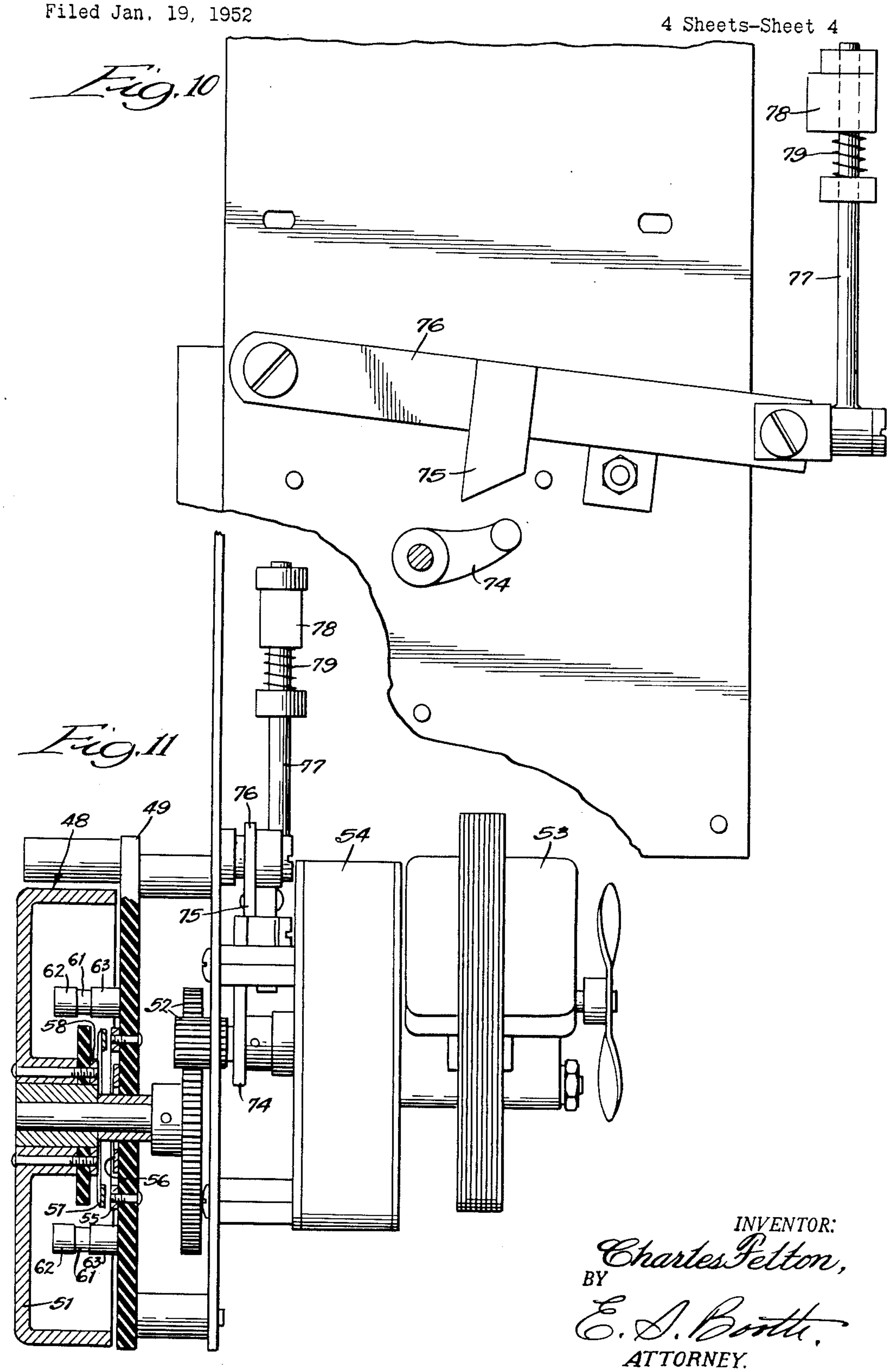
Figure 10 is a partial elevation illustrating the cam operating mechanism for the printer.
Figure 11 is a side view with parts in section showing the selector switch drive assembly.

The motor 13 is adapted to be connected successively to different sensing elements responsive to different conditions through a selector switch mechanism indicated generally at 48. As best seen in Figures 9 and 11, the selector switch mechanism comprises a fixed supporting plate or stator 49 mounted on the frame of the recorder unit and a rotor or rotating member 51 which is illustrated as being in the form of a cup shaped housing. The rotating member 51 is driven through gears 52 by a constantly rotating motor 53 which is preferably an electric synchronous motor, and which drives one of the gears 52 through a reducer 54. The larger of the gears 52 is connected directly to the housing 51 to turn it at a relatively low speed as the motor 53 operates, the ratio of the gears 52 preferably being such that the housing 51 will turn one revolution for each number of revolutions of the smaller gear 52 which corresponds to the number of sensing elements in the series.

The stationary switch member 49 carries a pair of concentric contact rings 55 and 56 which are adapted to be engaged respectively by contact members 57 and 58 which are carried by the rotor 51. The contact member 57 is preferably in the form of a flexible annular ring fastened at one point in its periphery to the rotor and carrying a contact button 59 which slidably engages the contact ring 55. The contact ring 56 may be similarly constructed to carry a contact button slidably engaging the contact ring 58. The fixed member 49 also carries an annular series of contact pins 61, which are spaced angularly about the axis of the rotor and each of which has secured thereto contact surfaces 62 and 63 which are insulated from each other, and axially spaced on the pins. The contact surfaces 62 and 63 on the pins are connected respectively to different sensing elements, such as thermocouples, to which the recorder is adapted to respond.

The contact pins are successively engaged by contact strips or bars 64 and 65 carried by an insulating arm 66 which turns with the rotor. At one end, the arm 66 has secured thereto a bracket 67 which fits loosely over a pin 68 carried by the rotor casing 51 so that the arm turns with the rotor but is free to pivot about the axis of the pin as well as turn through a limited angle about its own longitudinal axis. Such turning of the arm about its own axis enables the strips 64 and 65 to make good contact with the surfaces 62 and 63 on each pin even though these surfaces may be offset slightly in a radial direction relative to the pin.

Figure 8:
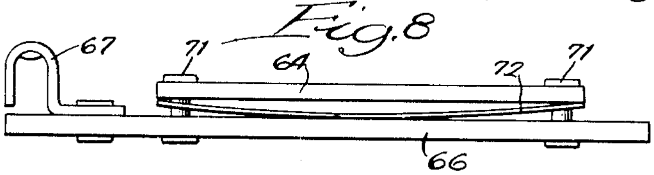
Figure 8 is an edge view of the selector switch rotor.

A spring 69 connected to the free end of the arm 66 urges it radially inward toward the pins 61 so that the contact strips 64 and 65 will engage respectively with and wipe over the contact surfaces 62 and 63 as the rotor turns. As best seen in Figure 8, the contact strips 64 and 65 are supported for free floating movement on pins 71 carried by the arm 66 and are resiliently urged outward on the pins by springs 72. In this way, the contact strips can float relative to the arm, that is, each can turn through a limited angle about its own longitudinal axis as well as move toward and away from the arm 66. Thus, the contact strips will make good contact with the surfaces 62 and 63 regardless of manufacturing inaccuracies. The contact strips 64 and 65 are connected through flexible leads 73 with the contact members 57 and 58 respectively, and through these contact members and the interengaging contact rings 55 and 56 with the motor 13. Thus, as the rotor turns so that the contact strips successively engage contact surfaces on the different pins, the motor is successively connected through the selector switch mechanism with the different sensing elements.

According to one feature of the invention, the contact strips 64 and 65 are of a length slightly greater than the distance between adjacent pins 61 as shown in Figure 9. With this construction, as the rotor turns the contact strips will engage the next contact pin in the series before interrupting their engagement with the preceding contact pin. Therefore, the motor 13 is at all times connected to at least one sensing element so that there will never be an open circuit condition under which the motor would tend to drive the carriage down scale.

The motor 53 also serves to operates the printing mechanism thereby to insure absolute synchronism between the selector switch and the printer. As shown, the smaller of the gears 52 carries a cam arm 74 which is adapted to engage a cam follower projection 75 on a lever 76 which is pivoted at one end on the frame. The free end of the lever 76 is connected through a link 77 to the cam bar 47 to turn it. As shown, the link 77 has a head 78 slidable thereon and urged in one direction thereon by a spring 79. The head 78 is connected to a crank pin on a crank 81 which is secured to the cam bar 47. In this way, as the link 77 is moved upward it will act through the spring 79 to turn the cam bar 47 to its printing position and the spring 79 can yield after the printing head has engaged the chart so that a firm printing contact of the head is insured without requiring extremely accurate adjustment of the mechanism.

In operation of the recorder with the motor 53 running the selector switch will successively connect the main motor 13 to different sensing elements in the series and after an adequate interval for adjustment of the carriage the printing mechanism will be operated to make a record.

Assuming, for example, that a record is to be made every 30 seconds, approximately 27 seconds will be allowed after connection of the main motor to a particular sensing element for adjustment of the carriage. During the last 3 seconds of the cycle the cam arm 74 will engage the cam projection 75 to move the printing head downward to effect a printing operation. As soon as the cam arm passes the cam projection 75 the cam bar 47 will return to its neutral position and the printing head will be raised by the spring 43.

At about this time the contact strips on the arm 66 will engage the contact surfaces on the next contact pin to connect the motor to the next sensing element in the series. For a very brief interval the motor will be connected to two sensing elements simultaneously so that there is no interval during which the motor tends to drive full down scale. After this brief interval, the motor will be connected only to the next succeeding sensing element and will adjust the carriage to a position corresponding to the value of the condition then being sensed. When the printing head moved back from its last printing operation the ratchet mechanism turned it to present the next printing character in the series corresponding to the sensing element to which the motor is now connected.

Therefore, when the printing head is again moved in a printing operation it will record the character which corresponds to the condition then being sensed. It will be seen that the mechanism remains in accurate synchronism throughout its operation and is capable of recording a number of different conditions through easily identifiable symbols.

While one embodiment of the invention has been shown and described in detail, it will be understood that this is illustrative only and is not to be taken as a definition of the scope of the invention, reference being had for this purpose to the appended claims.

What is claimed is:

1. In a recorder, the combination of, a frame, a carriage, means mounting said carriage on said frame for reciprocating movement along a rectilinear path and through a predetermined range, a printing head, an arm supporting said head and pivoted on said carriage for swinging of the head back and forth between an idle position and a printing position, means yieldably urging said arm toward said idle position, a fixed surface on said carriage, a surface on said arm spaced from said carriage surface transversely of said path a predetermined distance in said idle position of the arm and movable away from the carriage surface in the movement of the arm and said head toward said printing position, an elongated rectangular bar extending longitudinally of said path between said surfaces and throughout said range and having a width greater than said predetermined distance and a thickness less than the latter, means mounting opposite ends of said bar for rotation of the bar about its longitudinal axis and for limited lateral movement of the bar, and means for turning said bar about said axis thereof to separate said surfaces and swing said arm and said head toward said printing position.

2. In a recorder, the combination of, a frame, a carriage, means mounting said carriage on said frame for movement back and forth along a rectilinear path and through a predetermined range, a printing head, a printing arm supporting said head and pivoted on said carriage for swinging of the head between an idle position and a printing position, means yieldably urging said arm toward said idle position, an elongated flat rectangular bar extending longitudinally of said carriage path and throughout the length of the latter, means mounting opposite ends of said bar on said frame for rotation of the bar about its own longitudinal axis, and laterally spaced surfaces one on said arm and one on said carriage straddling said bar and spaced apart a distance less than the width of said bar when the arm is in said idle position whereby rotation of the bar about its longitudinal axis separates said surfaces and swings said arm away from said idle position and into said printing position.

References Cited in the file of this patent

UNITED STATES PATENTS

| | | |
|---|---|---|
| 1,039,724 | Gallaher | Oct. 1, 1912 |
| 1,832,918 | Swick | Nov. 24, 1931 |
| 2,118,081 | Grisdale | May 24, 1938 |
| 2,384,652 | Smith | Sept. 11, 1945 |
| 2,421,834 | Crowther | June 10, 1947 |
| 2,421,983 | Bentley | June 10, 1947 |
| 2,423,480 | Caldwell | July 8, 1947 |
| 2,428,129 | Smith | Sept. 30, 1947 |
| 2,424,094 | Caldwell | Oct. 10, 1950 |
| 2,527,207 | Barnes | Oct. 24, 1950 |